July 29, 1958 J. LIMATA 2,845,496

TELEPHONE HOLDER

Filed March 15, 1955 2 Sheets-Sheet 1

INVENTOR.

Joseph Limata

BY Victor J. Evans & Co.

ATTORNEYS

July 29, 1958 J. LIMATA 2,845,496

TELEPHONE HOLDER

Filed March 15, 1955 2 Sheets-Sheet 2

INVENTOR.
Joseph Limata

BY Victor J. Evans & Co.

ATTORNEYS 2,845,496
Patented July 29, 1958

2,845,496

TELEPHONE HOLDER

Joseph Limata, Phillipsburg, N. J.

Application March 15, 1955, Serial No. 494,428

5 Claims. (Cl. 179—149)

This invention relates to a telephone, and more particularly to a holder for a telephone.

The object of the invention is to provide a holder for a telephone whereby a person can readily use the telephone with his or her hands free to write or the like.

Another object of the invention is to provide a holder for a telephone of the type which includes a base and a movable receiver, whereby with the present invention the telephone receiver can be held adjacent the user's head to permit use of the telephone without the necessity of holding the receiver with the hand so that the hands are free to perform any necessary task.

A further object of the invention is to provide a telephone holder which is extremely simple and inexpensive to manufacture.

Other objects and advantages will be apparent during the course of the following description.

In the accompanying drawings, forming a part of this application, and in which like numerals are used to designate like parts throughout the same:

Figures 1, 2, 8, 9, 10:
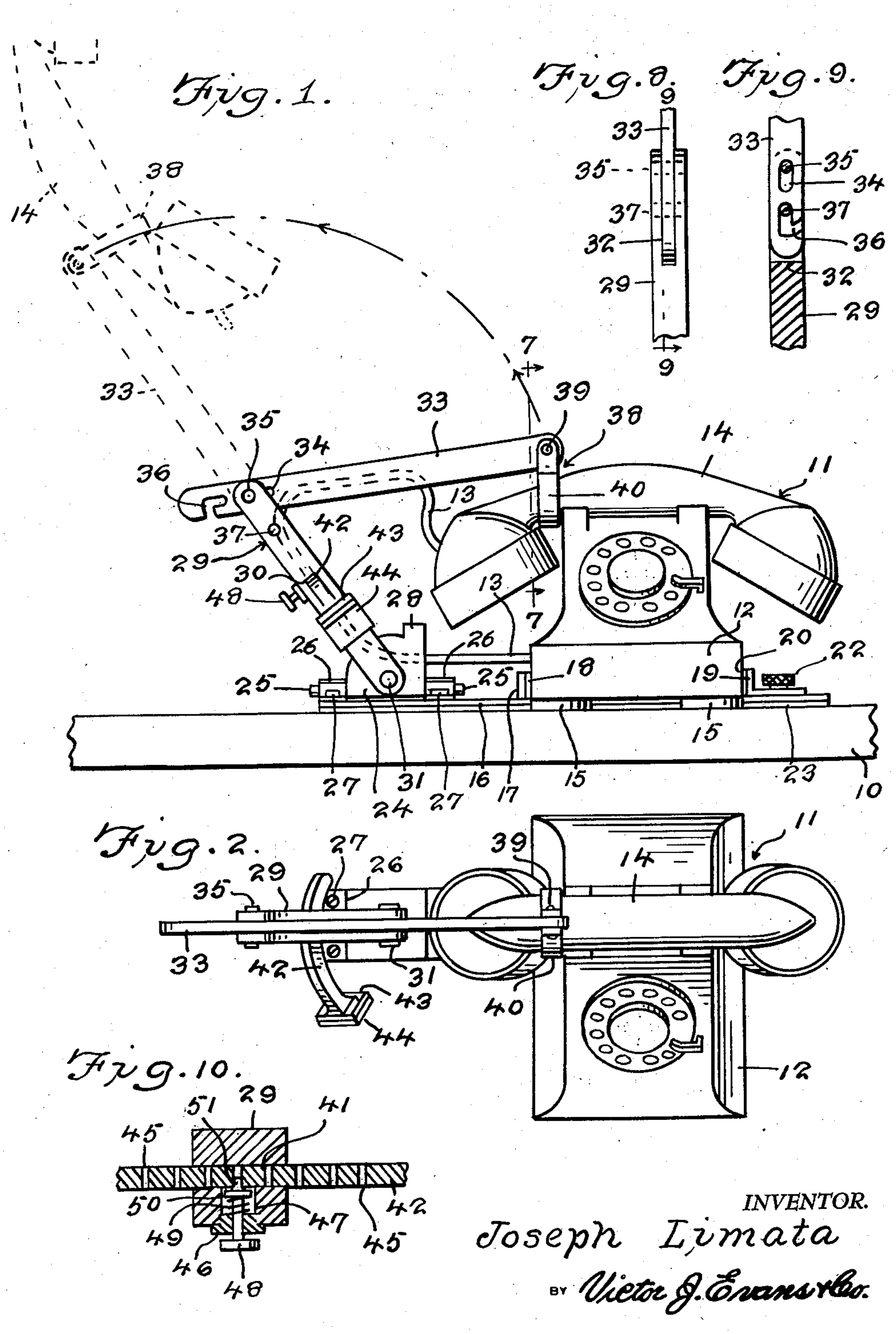
Figure 1 is a front elevational view of a telephone provided with the holder of the present invention.
Figure 2 is a top plan view of the assembly of Figure 1.
Figure 8 is an elevational view illustrating the pivotal connection between the arm and lever.
Figure 9 is a sectional view taken on the line 9—9 of Figure 8.
Figure 10 is a sectional view taken on the line 10—10 of Figure 4.

Referring in detail to the drawings, the numeral 10 designates a table or other supporting structure on which is supported a telephone 11 of conventional construction, and the telephone 11 includes a base 12 and movable handset 14 which has the usual wire 13 connected thereto. The base 12 may be supported by feet or legs 15, Figure 1.

The present invention is directed to a holder and the holder includes an elongated bracket 16 which extends beneath the base 12 as shown in the drawing. A means is provided for clamping the bracket 16 and base 12 together, and this means comprises a vertically disposed stationary jaw 17 which projects upwardly from the bracket 16 and is secured thereto in any suitable manner. A yieldable pad 18 of any suitable material such as cloth may be secured to the inner surface of the jaw 17. There is further provided an adjustable or movable jaw 19 of L-shape, Figure 6, and the jaw 19 is provided with a soft pad 20 on its inner surface, and the pads 18 and 20 prevent the jaws from marring the telephone base and these pads also help to retain the parts clamped together. There is further provided a means for maintaining the jaw 19 immobile in its adjusted positions and since the jaw 19 can be adjusted, the bracket 16 can be clamped to bases 12 of different sizes or shapes. Thus, the jaw 19 is provided with a slot 21 through which extends a bolt or securing element 22, and a clamping plate 23 is positioned below the bracket 16 and threadedly engaged by the bolt 22. Thus, by loosening the bolt 22 the jaw 19 can be shifted or adjusted to the desired position on the bracket 16.

Arranged adjacent an end of the bracket 16 is a pivotally mounted bearing block 24. Extending outwardly from the bearing block 24 are pivot pins 25 which are pivotally mounted in bearing members 26, and the bearing members 26 may be secured in place by bolts or the like 27, Figure 1. A shoulder or finger 28 is formed on the bearing block 24 for limiting pivotal movement of an arm 29.

Figures 3, 4, 5, 6, 7, 11:
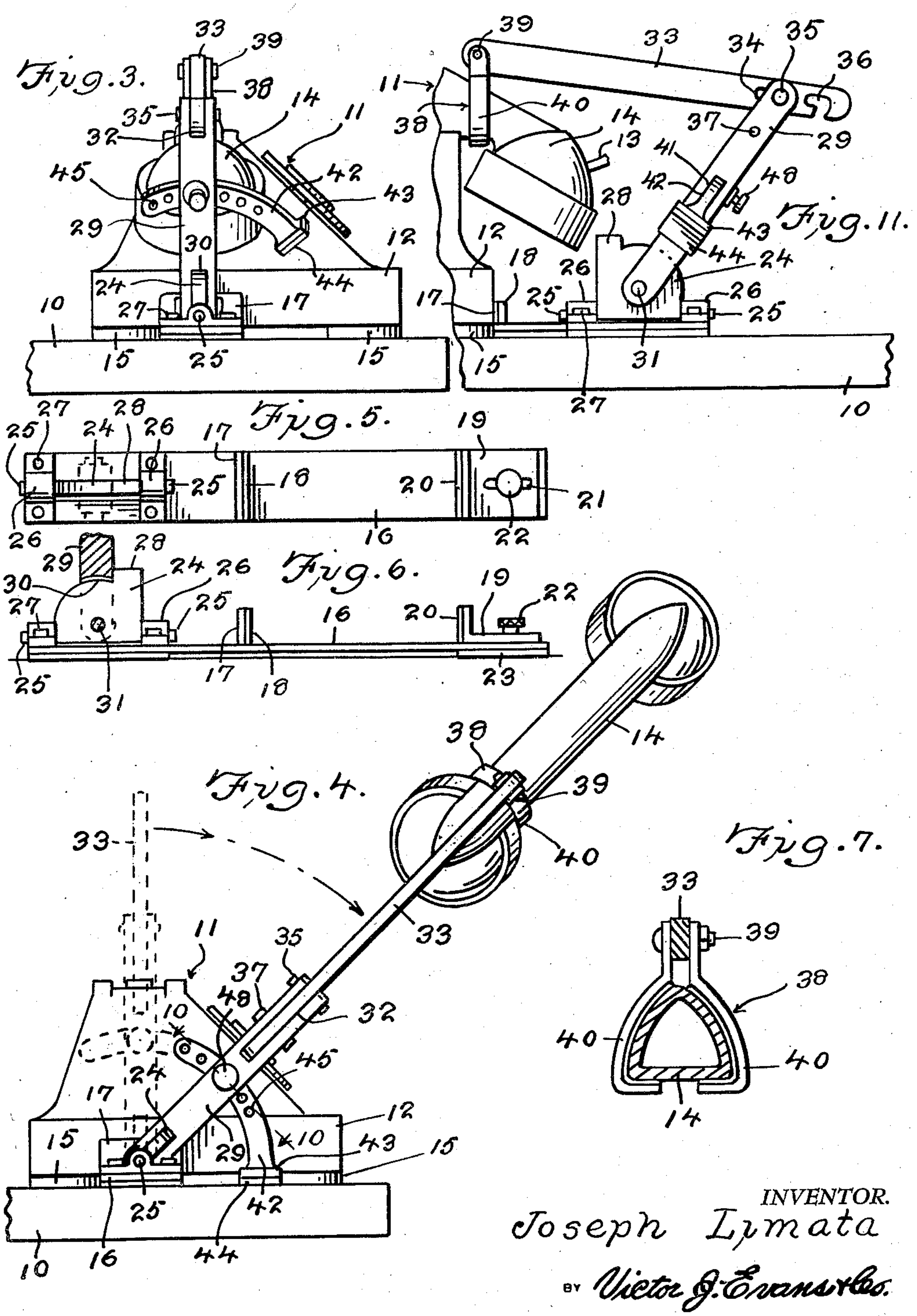
Figure 3 is a side elevational view illustrating the holder and telephone.
Figure 4 is a view looking at the opposite side of Figure 3 and showing the holder in operative position.
Figure 5 is a plan view of the bracket, with the telephone removed.
Figure 6 is a view taken at right angles to the view shown in Figure 5, and with parts broken away and in section.
Figure 7 is a sectional view taken on the line 7—7 of Figure 1.
Figure 11 is a fragmentary elevational view illustrating a modification wherein the bar or rest is arranged on the opposite side from that shown in Figures 1–10.

The lower end of the arm 29 is cut away or bifurcated as at 30 for pivotally receiving therein the bearing block 24, Figure 4. A pivot pin 31 extends through the lower end of the arm 29 and through the bearing block 24. The upper end of the arm 29 is also cut away or bifurcated as at 32, and a lever 33 is pivotally mounted in the bifurcated portion 32 through the medium of a pivot pin 35. The lever 33 is provided with a slot 34 through which extends the pin 35, Figure 1, and Figure 9. The lever 33 is further provided with an L-shaped slot or cutout 36 and this cutout 36 is adapted to receive a pin 37 on the arm 29 whereby the lever 33 can be readily locked in its adjusted or operative position so that the handset 14 can be supported adjacent the user's head.

Pivotally connected to the lever 33 is a clamp 38, Figure 7, and the clamp 38 is arranged in engagement with the handset 14. The clamp 38 includes a pair of clamping fingers 40 which may be adjustably or pivotally connected to the lever 33 through the medium of a bolt and nut assembly 39.

The arm 29 is provided with a cutout or recess 41, Figure 10, and adjustably mounted in the recess 41 is a curved rest or bar 42. The bar 42 is provided with a head 43 which has a pad 44 secured thereto, so that when the head and pad engage the supporting structure such as the table 10, the telephone handset 14 can be supported at the desired angle adjacent the user's head. A means is provided for maintaining the bar 42 immobile in its adjusted positions, and this means comprises a plurality of apertures or openings 45 which are arranged in the bar 42. A bushing 46 may be arranged in threaded engagement with an opening 47 in the arm 29, and a pin 48 is reciprocably arranged or connected to the bushing 46. A coil spring 49 is circumposed on the pin 48, and the coil spring 49 abuts a washer or securing element 50 for normally urging the inner end 51 of the pin 48 into engagement with one of the apertures 45. When the bar 42 is to be adjusted, it is only necessary to manually grip the pin 48 and move it outwardly to permit shifting or adjustment of the bar 42 in the arm 29.

From the foregoing it is apparent that there has been provided a holder which will permit a person to use a telephone without the necessity of holding the handset such as the handset 14 with the hand. In use the bracket 16 may be positioned beneath the base 12 of the telephone 11 as shown in the drawings, and then the jaw 19 can be adjusted so that the jaws 17 and 19 engage opposite sides of the telephone base 12. When the telephone is not being used the parts are in the position shown in Figures 1, 2 and 3, and when the telephone is being used, the parts are in the position shown in Figure 4. Thus, to use the telephone it is only necessary to manually grip the handset 14 and move the handset from the position shown in solid lines in Figure 1 to the position shown in dotted lines. Thus, the lever 33 will pivot about the pin 35 and the cutout 36 will receive the pin 37 to lock the lever 33 in its extended or operative position so that the receiver 14 will be supported adjacent the person's head. At the same time that the lever 33 is being pivoted, the arm 29 can swing on the pin 31. The shoulder 28 will limit pivotal movement of the arm 29 on the bearing block 24. Furthermore, there will be a simultaneous pivotal movement of the bearing block 24 through the medium of the pins 25 which extend through the bearings 26. Thus, the telephone receiver can be positioned at a point which is convenient or adjacent the user's head. The bar 42 can be adjusted by means of the spring pressed pin so as to permit the head on the bar to engage the upper surface of the table 10 to limit swinging movement of the parts, whereby the telephone will be maintained immobile. After the telephone conversation has been completed, the reverse procedure can be followed so that the parts can be moved from the position shown in Figure 4 back to the position shown in solid lines in Figure 1, or to the position shown in Figures 2 and 3.

As shown in Figure 11 the bar 42 can be completely removed from the recess 41 in the arm 29 and extended through the opposite side of the arm 29 so as to permit the telephone to be supported in a position opposite that shown in Figures 1–10.

It is to be understood that the present invention is constructed so that the telephone is used in the usual manner and in removing the handset 14 for use, there is used a simultaneous lifting and swinging movement whereby the handset is moved in a substantially arcuate path to its resting place. In other words, the handset can be raised up and brought forward simultaneously. The bracket 16 fits between the legs 15 of the telephone. To change the position of the bar 42 it is only necessary to actuate the pin 48. Further, the bar 42 can be used on either the right or left side of the telephone by completely removing the bar 42 and reversing its position. The present invention can be readily mass produced. Thus, the phone can be used without the necessity of holding it in the hand or between the shoulder and head and the device is especially useful to persons in businesses or offices who need complete freedom of the hands to write, take notes, reach for things and the like. The phone can be placed back in the cradle of the base when not being used. Pieces of rubber or the like can be arranged on the inner surfaces of the fingers 40 which grip the handset 14.

I claim:

1. In a holder for a telephone of the type including a base and a movable handset, a bracket extending below the base of the telephone, a fixed jaw extending upwardly from said bracket intermediate the ends thereof and secured thereto, an L-shaped jaw adjustably mounted on said bracket and provided with a slot therein, said L-shaped jaw permitting the bracket to be connected to bases of different sizes by virtue of its adjustability, a securing element extending through said slot and through said bracket, a clamping plate arranged in engagement with the lower end of said securing element, a bearing block having pins extending therefrom pivotally connected to said bracket, an arm having a bifurcated lower end pivotally connected to said bearing block, the upper end of said arm being bifurcated, a lever pivotally connected to the upper bifurcated portion of said arm, and a clamp pivotally and adjustably mounted on an end of said lever and arranged in engagement with the telephone handset.

2. The structure as defined in claim 1, and further including a shoulder on said bearing block for engagement with said arm for limiting pivotal movement of said arm on said bearing block.

3. The structure as defined in claim 1, wherein said lever is provided with an L-shaped cutout, and a pin carried by said arm for engagement with said cutout.

4. The structure as defined in claim 1, and further including yieldable pads secured to the inner surfaces of said jaws.

5. In a holder for a telephone of the type including a base and a moveable handset, a bracket extending below the base of the telephone, a fixed jaw extending upwardly from said bracket intermediate the ends thereof and secured thereto, an L-shaped jaw adjustably mounted on said bracket and provided with a slot therein, said L-shaped adjustable jaw permitting the bracket to be connected to bases of different sizes, a securing element extending through said slot and through said bracket, a clamping plate arranged in engagement with the lower end of said securing element, a bearing block having pins extending therefrom pivotally connected to said bracket, an arm having a bifurcated lower end pivotally connected to said bearing block, the upper end of said arm being bifurcated, a lever pivotally connected to the upper bifurcated portion of said arm, and a clamp pivotally and adjustably mounted on an end of said lever and arranged in engagement with the telephone handset, a shoulder on said bearing block for engagement with said arm for limiting pivotal movement of said arm on said bearing block, there being an L-shaped cutout in said lever, a pin carried by said arm for engagement with said cutout, yieldable pads secured to the inner surfaces of said jaws, there being a recess in said arm, a curved bar extending through said recess, a bushing arranged in engagement with said arm, a pin slidably mounted in said bushing, a coil spring circumposed on said pin, there being a plurality of apertures in said bar for receiving the inner end of said last named pin.

References Cited in the file of this patent

UNITED STATES PATENTS 1,690,475 Carmer ---------------- Nov. 6, 1928